Patented July 3, 1945

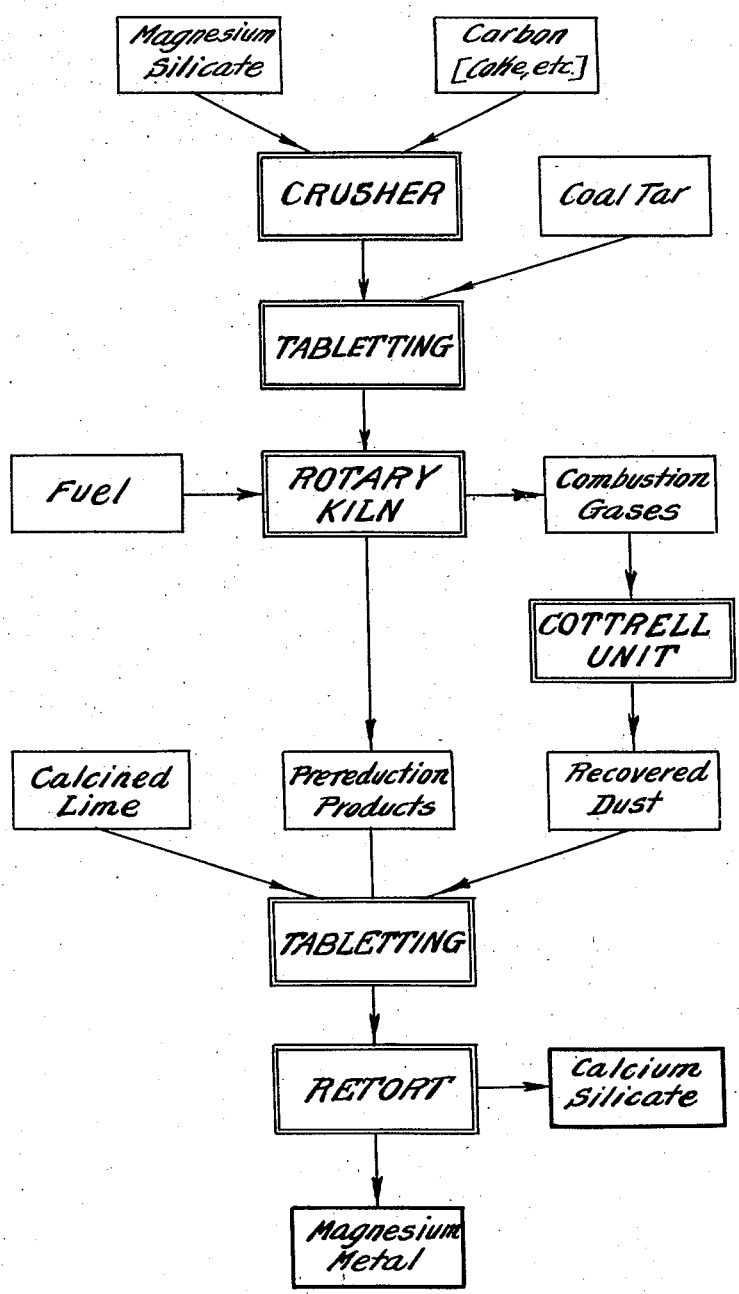

2,379,576

UNITED STATES PATENT OFFICE 2,379,576

PROCESS FOR PRODUCING METALLIC MAGNESIUM FROM MAGNESIUM SILICATES

Fritz J. Hansgirg, Black Mountain, N. C., assignor to North Carolina Magnesium Development Corporation, Asheville, N. C., a corporation of North Carolina Application August 18, 1944, Serial No. 550,062

14 Claims. (Cl. 75—67)

This invention relates to the production of metallic magnesium and has for its general object the provision of a novel process for recovering the metal through direct reduction of magnesium silicates by forming the reducing agent internally in the compound to be reduced.

In my copending application, Serial Number 506,868, filed October 19, 1943, I have described a process in which magnesium silicates are first subjected to a prereduction in order to reduce the accompanying oxides of heavy metals. Such prereduced ores are then treated with calcium carbide thus forming metallic magnesium in the vapor state in vacuo. At the same time calcium silicates are formed as a by-product. The temperature for the prereduction is disclosed as being within the approximate range of 900–1000° C.

The present invention, in its preferred embodiment, contemplates the carrying out of the prereduction at a much higher temperature at which the silica contained in the ore forms metallic silicon. In the next step the materials so formed are subjected to a heating process in high vacuo in which the previously formed silicon reduces the magnesium oxide still contained in the pretreated ore. Magnesium vapors are formed which can be condensed in known manner.

In the steel industry it is known that silica can be reduced at comparatively low temperatures according to the equation:

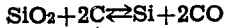

This reaction starts with considerable speed at temperatures as low as 1600° C. and under the conditions of the iron blast furnace the metallic silicon alloys with the iron, forming ferro-silicon. There is generally not more than 30% silicon in such pig iron. This process is used with the so-called hot-running blast furnace, which means that temperatures up to 1650° C. are maintained in the lower part of the blast furnace.

For the purpose of producing ferro-silicon with a much higher percentage of silicon, higher temperatures have to be used and generally the reduction of silica with carbon in the presence of scrap iron has had to be carried out in an electric furnace. However, the use of the electric arc is only necessary if the ferro-silicon has to be tapped from such a furnace in order to recover it in coherent castings.

For the carrying out of a reduction process of magnesium oxide with silicon or ferro-silicon of high percentage, it is not necessary to have such a reducing agent in coherent form because the silicon or the ferro-silicon has to be ground to a fine powder and then has to be mixed with the magnesium oxide to be reduced.

According to the present invention, the silicon or the ferro-silicon is not produced first in a coherent mass. In the case of magnesium silicates, it is, on the contrary, a great advantage to have the silicon or the ferro-silicon evenly distributed through the mass of the magnesium oxide, remaining unreduced at the range of temperature chosen. After the prereduction of the magnesium silicates has been carried out, the resulting mass consists of unreduced magnesium oxide and, finely distributed through this magnesium oxide, silicon and/or ferro-silicon in the metallic state. If such a product is then pressed into tablets either with or without calcium oxide and heated to a temperature of 1200° C. to 1300° C. under high vacuum, the silicon reduces the magnesium oxide to metallic magnesium and forms silica (or calcium silicate if calcium oxide has been previously added).

In carrying out the process, the magnesium silicates are previously mixed with some carbonaceous material and carried through a heating zone maintained between approximately 1600° C. and 1750° C. At such temperatures, the silica contained in the magnesium silicates is reduced but the magnesium oxide is generally not changed at this stage. The carbonaceous material suitable for such prereduction can be: metallurgical coke, petroleum coke, anthracite coal, or even coal with a low ash content and not too highly bituminous. It is of advantage to grind up the magnesium silicates with the carbonaceous material in stoichiometric ratio on the basis of the fixed carbon content. The amount of carbon added is determined by the amount of silicon necessary to reduce the magnesium oxide contained in the ore. It is also advantageous to make this intimate mixture into tablets or briquettes, a carbon binder being added. The intimate powder mixture can, for example, be mixed with coal tar or any suitable hydrocarbon, giving a coke skeleton when subjected to higher temperatures and thus agglomerating the powder constituents with a coke skeleton before they are subjected to the reaction temperature.

It has been further found that at this low temperature not only silicon and ferro-silicon are formed but also silicon monoxide. Such silicon monoxide possesses the same reducing power as silicon or ferro-silicon since it forms magnesium according to the reaction:

This process of prereduction or preforming of the reducing agent, proceeds with higher speed, the higher the reduction temperature. But at such temperatures, a partial reduction of the magnesium oxide also takes place so that magnesium vapors are formed at the same time, which will diminish the amount of magnesium oxide available. This can be easily counteracted if in the reduction zone, there is a surplus of carbon monoxide as in such case the magnesium vapors react with the carbon monoxide forming again magnesium oxide and carbon. Such magnesium oxide then becomes a part of the total quantity of magnesium oxide in the general products of partial reduction.

The accompanying flow sheet will illustrate the various steps in the novel process according to a practical example. As a starting material an olivine of the following composition may be used:

| | Per cent |
|---|---|
| MgO | 48.45 |
| SiO₂ | 42.26 |
| Fe₂O₃ | 8.82 |
| CrO₂ | 0.47 |

As reducing agent an anthracite is used containing 88% fixed carbon. For the reduction of 48.45 parts of magnesium oxide contained in the olivine, 16.5 parts of silicon must be formed from 35.5 parts of silica. This will require 16.5 parts of anthracite. For the reduction of the other constituents of the olivine, such as the conversion of the iron and chromium oxides into metallic iron and chromium respectively, 3 parts of anthracite are necessary. Therefore for 1000 lbs. of olivine, 195 lbs. of anthracite giving 88% fixed carbon have to be added. Eight and eight-tenths (8.8) parts of ferric oxide give 6.16 parts iron which together with 16.5 parts of silicon gives a 73% ferro-silicon.

The staring materials are subjected to a fine grinding in a ball mill, and to the resulting fine powder there is added from about 8% to 10% of coal tar. The powder and tar mixture is subjected to some shaping in an extruding press or in a roller briquetting machine. Such material is then charged into a rotary kiln where it is heated in a counterflow by hot combustion gases preferably produced by a coal dust or oil burner located at the discharge end of the rotary kiln.

It is important that this partial reduction process be conducted in a strictly neutral or a reducing atmosphere. For that reason a surplus of carbon monoxide is provided in the combustion gases. The fuel gases carry with them some magnesium oxide reduced in the partial reduction process, but this cannot readily be prevented. It is important to recover this dust, consisting of carbon and magnesium oxide, from the fuel gases and it may be done by the use of cyclone separators or, preferably, by means of a Cottrell precipitator unit. The magnesium oxide so recovered from the fuel gases is later combined with the main products of partial reduction containing the mixture of silicon and/or ferro-silicon, and magnesium oxide.

The general practice with respect to the use of the rotary kiln has to be changed a little, since the hot partially reduced material cannot be cooled in an air stream as is usually the case. In the rotary cooler the fuel gases coming from the Cottrell plant, which are entirely neutral and nonoxidizing, may be used to cool the partially reduced material discharged at about 1750° C. from the rotary kiln end. The secondary air necessary for the oil burners or the coal dust burners has to be preheated separately in a regenerative heating system, as is well known in industry.

The mixture of silicon and/or ferro-silicon, and magnesium oxide, combined with the magnesium oxide recovered from the fuel gases, is again subjected to a grinding process preferably together with calcined lime, and such mixture is then tabletted with or without a binder. The tablets thus formed are charged into retorts and heated to a temperature of from about 1200° C. to 1300° C. under high vacuum (say from about 0.1 mm. to about 10 mm. of mercury). Magnesium vapors are then formed and condensed on the cooler parts of the retorts in known manner and recovered in form of crystals. Such crystals are transformed into magnesium ingots either by melting or by extrusion, according to practices well known in the art.

The remaining calcium silicates can be subjected to a procedure similar to that described in my copending patent application, Serial Number 506,868, and made into cement clinkers. Iron-chromium alloys also may be obtained from the residues but these iron-chromium alloys will still contain some silicon as it is not possible to react the silicon entirely during the magnesium production process.

This process marks a great advance over all known magnesium production processes known up to present time since it can be carried out without the use of electricity. The first step of partial reduction can be done in a conventional rotary kiln using fuels like coal dust, oil, or gas. The second step can also be done by the use of an oil or gas fire, as in the usual ferro-silicon process where mixtures of dolomite and high percentage ferro-silicon are subjected to a heating process in order to recover metallic magnesium. This known ferro-silicon reduction process is highly uneconomical, however, on account of the high cost of the reducing agent. Ferro-silicon, if it has to be specially prepared in compact form by means of the electric furnace, is very expensive. The heat necessary to reduce silica to ferro-silicon is in the present invention furnished entirely by burning ordinary fuel, whereas in the old ferro-silicon process this heat of formation must be provided by electric energy in open electric furnaces of low efficiency.

If serpentines are used as a starting material in the present novel process, water has to be driven out during the partial reduction process. This can be done in the same step of partial reduction as described before with the difference that a greater amount of reducing agent or anthracite is necessary, since the water released by the serpentines reacts at higher temperatures with the admixed carbonaceous material in forming water gas.

Various changes and modifications may be made in the exemplary method described and illustrated herein, without departing from the broad scope of the invention as defined in the subjoined claims. For example, if local conditions permit, the partial reduction can be carried out in electrically heated shaft furnaces, or the briquetted raw material can be used as electrical conductors in a circuit to effect the heating of the material to the temperatures disclosed. Also, the second step of forming metallic magnesium can be carried out in electrically heated equipment, and instead of retorts, rotating drums or continuously working furnaces can be used. Then too, if it is found that the silicate to be used does not contain enough iron oxide, some iron ore may be added to form a ferro-silicon containing about 75% silicon.

Having thus described the invention what is claimed as new and desired to be secured by Letters Patent is:

1. A process for producing metallic magnesium from magnesium silicates, which comprises effecting a partial reduction under conditions promoting the reduction of the silica content to metallic silicon without affecting the magnesium oxide content to any substantial extent, and then reacting the resulting partially reduced material at elevated temperatures, whereby the silicon produced serves to reduce the magnesium oxide to form metallic magnesium.

2. A process for producing metallic magnesium from magnesium silicates, which comprises effecting a partial reduction thereof under conditions promoting the reduction of the silica content to form silicon monoxide without affecting the magnesium oxide content to any substantial extent, and then reacting the resulting partially reduced material at elevated temperatures, whereby the silicon monoxide produced serves to reduce the magnesium oxide to form metallic magnesium.

3. A process for producing metallic magnesium from magesium silicates, which comprises effecting a partial reduction thereof under conditions promoting the reduction of the silica content to form silicon and silicon monoxide without affecting the magnesium oxide content to any substantial extent, and then reacting the resulting partially reduced material at elevated temperatures, whereby the silicon and silicon monoxide produced serves to reduce the magnesium oxide to form metallic magnesium.

4. A process for producing metallic magnesium from magnesium silicates containing iron, which comprises effecting a partial reduction thereof under conditions promoting the reduction of the silica content to form silicon, which at least in part alloys with the iron present to form ferro-silicon, all without affecting the magnesium oxide content to any substantial extent, and then reacting the resulting partially reduced material at elevated temperatures, whereby the ferro-silicon produced serves to reduce the magnesium oxide to form metallic magnesium.

5. A process for producing metallic magnesium from magnesium silicates, which comprises effecting a partial reduction thereof under conditions promoting the reduction of the silica content to form silicon without affecting the magnesium oxide content to any substantial extent, and then reacting the resulting partially reduced material at elevated temperatures and under high vacuum, whereby the silicon produced serves to reduce the magnesium oxide to form metallic magnesium, and the magnesium is sublimed.

6. A process for producing metallic magnesium from magnesium silicates containing iron, which comprises effecting a partial reduction thereof under conditions promoting the reduction of the silica content to form silicon, which at least in part alloys with the iron present to form ferro-silicon, all without affecting the magnesium oxide content to any substantial extent, and then reacting the resulting partially reduced material at elevated temperatures and under high vacuum, whereby the ferro-silicon produced serves to reduce the magnesium oxide to form metallic magnesium, and the magnesium is sublimed.

7. A process for producing metallic magnesium from magnesium silicates, which comprises heating said silicates with a reducing agent to effect a partial reduction thereof under conditions promoting the reduction of the silica content to form silicon without affecting the magnesium oxide content to any substantial extent, and then reacting the resulting partially reduced material at elevated temperatures and under high vacuum, whereby the silicon produced serves to reduce the magnesium oxide to form metallic magnesium, and the magnesium is sublimed.

8. A process for producing metallic magnesium from magnesium silicates, which comprises heating said silicates with a carbonaceous reducing agent in stoichiometric proportions based on the amount of fixed carbon in said agent to effect a partial reduction thereof under conditions promoting the reduction of the silica content to form silicon without affecting the magnesium oxide content to any substantial extent, and then reacting the resulting partially reduced material at elevated temperatures, whereby the silicon produced serves to reduce the magnesium oxide to form metallic magnesium, the amount of carbonaceous reducing agent employed being sufficient to produce the amount of silicon necessary to reduce all of the magnesium oxide.

9. A process for producing metallic magnesium from magnesium silicates containing iron, which comprises heating said silicates with a carbonaceous reducing agent in stoichiometric proportions based on the amount of fixed carbon to effect a partial reduction thereof under conditions promoting the reduction of the silica content to form silicon, which at least in part alloys with the iron present to form ferro-silicon, all without affecting the magnesium oxide content to any substantial extent, and then reacting the resulting partially reduced material at elevated temperatures and under high vacuum, whereby the ferro-silicon produced serves to reduce the magnesium oxide to form metallic magnesium, and the magnesium is sublimed.

10. A process for producing metallic magnesium from magnesium silicates containing iron, which comprises heating said silicates with a carbonaceous reducing agent under conditions promoting the reduction of the silica content to form silicon and silicon monoxide, at least part of the silicon alloying with the iron present to form ferro-silicon, all without affecting the magnesium oxide content to any substantial extent; then reacting the products of said heating step under elevated temperature and under vacuum, whereby the silicon, silicon monoxide, and ferro-silicon serve to reduce the magnesium oxide to form metallic magnesium and the magnesium is sublimed; and condensing the magnesium.

11. A process for producing metallic magnesium from magnesium silicate ore by internal reduction, which comprises mixing the crushed ores with divided carbonaceous material in stoichiometric proportions based on the amount of fixed carbon in said material and the amount of said available carbon needed to produce the proportions of silicon necessary to reduce the magnesium oxide content of the ore; heating the mixture to a temperature from about 1600° C. to about 1750° C., whereby the desired proportion of the silica is converted to silicon in a form and in an amount capable of being subsequently employed to reduce the magnesium oxide content without however affecting the greater part of the magnesium oxide of the ore; mixing said materials with calcined lime; reacting the mixture at a temperature of from about 1200° C. to about 1300° C. and under a high vacuum, whereby the magnesium oxide is reduced by means of the silicon, the metallic magnesium is sublimed, and a residue is formed which contains calcium silicate; and condensing the magnesium.

12. A process for producing metallic magnesium from magnesium silicate ore by internal reduction, which comprises mixing the crushed ores with divided carbonaceous material in stoichiometric proportions based on the amount of fixed carbon in said material and the amount of said available carbon needed to produce the proportion of silicon necessary to reduce the magnesium oxide content of the ore; briquetting the mixed materials; heating the mixture to a temperature from about 1600° C. to about 1750° C. while passing non-oxidizing heating gases over it, whereby the desired proportion of the silica is converted to silicon in a form and in an amount capable of being subsequently employed to reduce the magnesium oxide of the ore; recovering any magnesium oxide which may be carried off by the heating gases; tabletting said materials with calcined lime; reacting the mixture at a temperature of from about 1200° C. to about 1300° C. and under a high vacuum, whereby the magnesium oxide is reduced by means of the silicon, the metallic magnesium is sublimed, and a residue is formed which contains calcium silicate; and condensing the magnesium.

13. A process for producing metallic magnesium from magnesium silicate ore by internal reduction, which comprises mixing the crushed ores with divided carbonaceous material in stoichiometric proportions based on the amount of fixed carbon in said material and the amount of said available carbon needed to produce the proportion of silicon necessary to reduce the magnesium oxide content of the ore; heating the mixture to a temperature from about 1600° C. to about 1750° C. while passing heating gases of a reducing character over it, whereby the desired proportion of the silica is converted to silicon in a form and in an amount capable of being subsequently employed to reduce the magnesium oxide content without however affecting the greater part of the magnesium oxide of the ore; passing the heating gases from the reducing step through a separator; returning any magnesium oxide which may have been carried off by said gases to the partially reduced materials, and utilizing the remaining neutral gases from the separator to cool said partially reduced material; reacting the mixture at a temperature of from about 1200° C. to about 1300° C. and under a vacuum of about 0.1 mm. to about 10 mm. of mercury, whereby the magnesium oxide is reduced by means of the silicon, the metallic magnesium is sublimed, and a residue is formed which contains calcium silicate; and condensing the magnesium.

14. A process for producing metallic magnesium from magnesium silicate ore containing iron by internal reduction, which comprises mixing the crushed ores with divided carbonaceous material in stoichiometric proportions based on the amount of fixed carbon in said material and the amount of said available carbon needed to produce the proportion of silicon necessary to reduce the magnesium oxide content of the ore; heating the mixture to a temperature from about 1600° C. to about 1750° C. whereby the desired proportion of the silica is converted to silicon, silicon monoxide, and ferro-silicon, without however affecting the greater part of the magnesium oxide of the ore; reacting the mixture at a temperature of from about 1200° C. to about 1300° C. and under a vacuum whereby the magnesium oxide is reduced by means of the silicon, silicon monoxide, and ferro-silicon, the metallic magnesium is sublimed, and a residue is formed which contains calcium silicate and iron alloys; and condensing the magnesium.

FRITZ J. HANSGIRG.